United States Patent [19]

Feller et al.

[11] 4,375,853

[45] Mar. 8, 1983

[54] APPARATUS FOR SEPARATING CLODS AND AGRICULTURAL PRODUCTS

[75] Inventors: Ron Feller, Ramat-Efal; David Nahir, Bat-Yam, both of Israel; Charlie G. Coble, Bryan, Tex.

[73] Assignee: Texas A & M University System, College Station, Tex.

[21] Appl. No.: 300,658

[22] Filed: Sep. 9, 1981

Related U.S. Application Data

[63] Continuation of Ser. No. 102,998, Dec. 12, 1979, abandoned.

[51] Int. Cl.³ ............................................. B07C 5/00
[52] U.S. Cl. ............................................. 209/640
[58] Field of Search ............... 209/640, 642, 638, 641, 209/699, 692, 693, 637

[56] References Cited

U.S. PATENT DOCUMENTS

| 1,641,492 | 9/1927 | Jasperson | 209/637 |
| 1,692,343 | 11/1928 | Möller | 209/640 |
| 2,666,524 | 1/1954 | Payne | 209/640 |

FOREIGN PATENT DOCUMENTS

| 951161 | 10/1949 | France | 209/638 |
| 1513792 | 1/1968 | France | 209/640 |
| 4684 | 9/1909 | United Kingdom | 209/640 |

Primary Examiner—Allen N. Knowles
Attorney, Agent, or Firm—Pravel, Gambrell, Hewitt, Kirk & Kimball

[57] ABSTRACT

Method and apparatus for separating clods from a mixture of clods and desirable agricultural product utilizing conveyor mechanism for conveying a mixture of clods and agricultural product to a position for free fall onto a separation surface, from which surface the clods and agricultural product rebound different distances into receiving areas.

5 Claims, 7 Drawing Figures

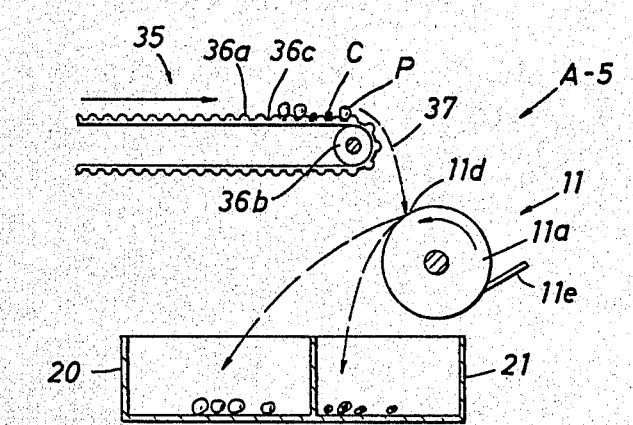
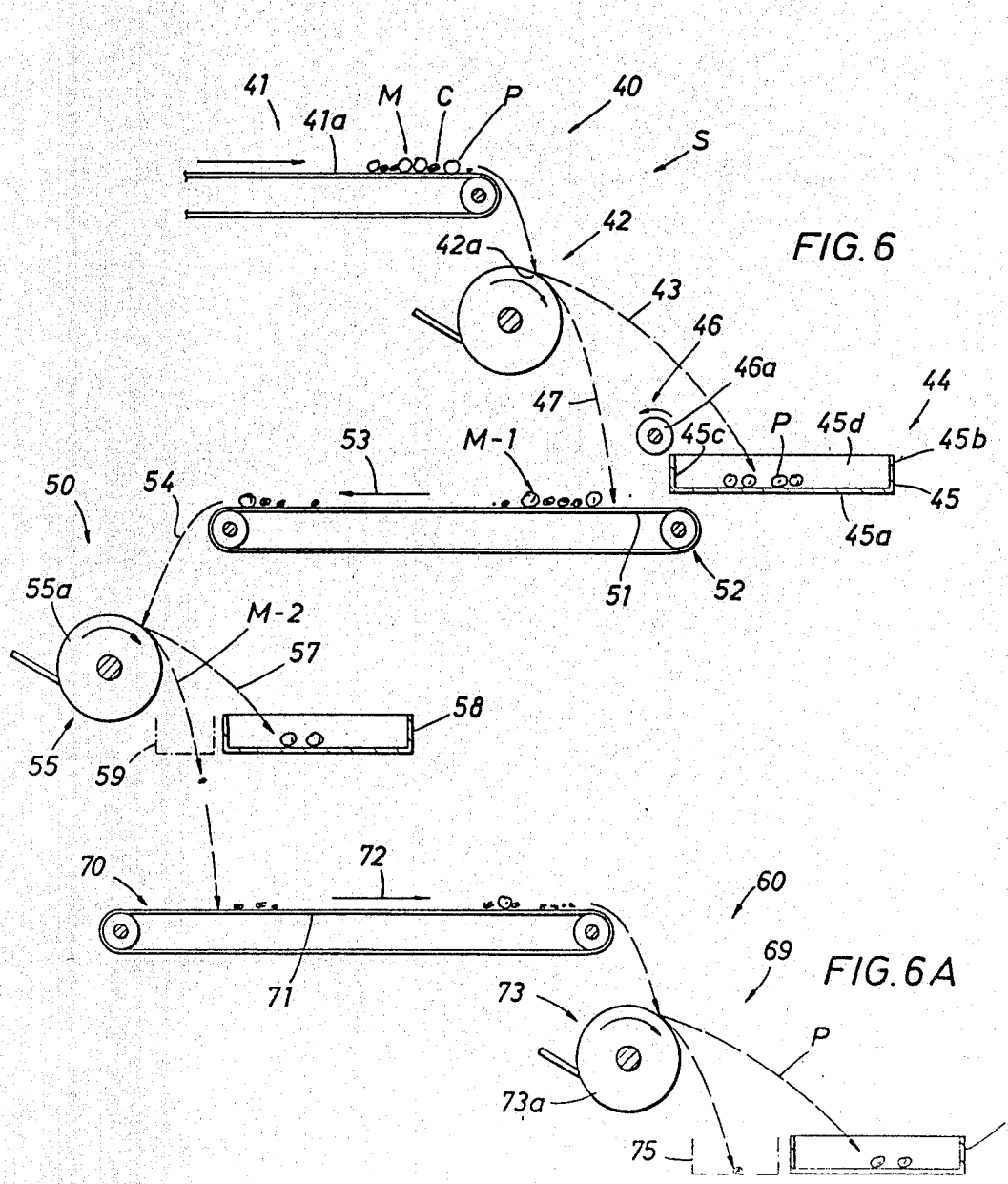
FIG. 5
FIG. 6
FIG. 6A

APPARATUS FOR SEPARATING CLODS AND AGRICULTURAL PRODUCTS

This is a continuation of application Ser. No. 102,998, filed Dec. 12, 1979, now abandoned.

TECHNICAL FIELD

The field of this invention relates to the separation of clods such as dirt clods and the like from agricultural product.

Presently, it is known to remove certain agricultural products such as potatoes and onions from the ground utilizing machinery which picks up not only the agricultural product but also the surrounding soil. Thereafter, part of the soil is removed from the mixture of agricultural product and soil due to travel of the mixture along a draper chain conveyor, sometimes called a "potato chain". The "potato chain" allows for the removal of loose, friable soil which falls in the spaces between the rollers which make up the conveyor.

In areas of the country such as Texas where the soil is hard and chunky, the larger clods of soil harvested with the agricultural product are not easily separated from each other, and, it is typical that clods of about the size of the agricultural product remain with the product even after travel across a "potato chain". It is then necessary to remove the clods from the mixture of clods and agricultural product. This was done by hand for many years, and still is done by hand in many instances. The utilization of labor to do this separation is undesirable from a number of points of view. First of all, as the cost of agricultural labor increases, the cost of separating clods and agricultural product likewise increases. Additionally, the efficiency of the manual separation process depends upon the actual working efficiency of the laborers, which certainly can vary from worker to worker, with all workers being subject to a loss of efficiency through tedium and fatigue.

This problem has been known in the agricultural industry for a number of years and various attempts have been made to separate undesirable agricultural product and clods and the like from the desired or good agricultural product.

PRIOR ART

U.S. Pat. No. 3,675,769 of Story is directed to a method and apparatus for separating potatoes from stones and soil clods. The method and apparatus disclosed in this patent utilizes electronic principles to separate the clods from the potatoes by electronically comparing the reflectance of the product in various light band widths to the reflectance of the stones and clods and sorting after detection of the reflectance by a differential detection mechanism responsive to the light reflected from each element. Another at least partly electronic solution is proposed in the article "Selective Fruit Separation for Mechanical Tomato Harvester" written by K. Q. Stephenson, Agricultural Engineering, 45:250–253, May, 1964. In this article Mr. Stephenson suggests a combination of the use of shaking devices for shaking the tomatoes from the vines and the use of photo-conductive devices for separation of green and undesirable fruit from the desirable fruit.

A separation method utilizing the observation that green fruit float to the surface of a brine solution more rapidly than ripe fruit is disclosed in the publications "Mass Grading Machine-Harvested Tomatoes" by A. A. Kattan, R. H. Benedict, G. A. Albritton, H. F. Osborne and C. Q. Sharp, Arkansas Farm Research, Vol. XVIII, No. 1, January–February, 1968, p. 5 and in "A Mechanical Sorter For Tomatoes" by A. A. Kattan, C. Q. Sharp and J. R. Morris, Arkansas Farm Research, Vol. XVIII, No. 1, p. 8, January–February, 1969.

U.S. Pat. No. 4,116,339 of Holmes contains a comprehensive discussion of the same problems addressed by this invention. The solution offered in the Holmes patent is the utilization of a vibrating cylinder for separating tomatoes according to maturity. The apparatus disclosed in the Holmes patent includes a central vibrating cylinder having conveyor belts positioned on each side of the cylinder for conveying a mixture of tomatoes at various stages of ripeness along the centrally located cylinder, which is caused to vibrate at a predetermined rate. The conveyor belts located on each side of the central vibrating cylinder are canted inwardly to cause the fruit to rest against the vibrating cylinder with the green tomatoes being ejected off of the conveyor into receptacles located at either side of the vibrating cylinder while the riper, red tomatoes fall into a receptacle located at the end of the conveyors.

A method of mechanically pregrading citrus fruit is disclosed in the article "Progress on Mechanically Grading Citrus Fruit in Process Plants" by Dr. William L. Bryan, Transactions of the 1974 Citrus Engineering Conference, American Society of Mechanical Engineers, Florida Section, Vol. XX, 24–35. In this article, citrus fruit is separated utilizing an inclined ramp having a curved portion at the bottom which allows the mixture of unwholesome fruit and desirable fruit to roll down the inclined ramp and travel off the curved portion different distances into different receptacles. It is also disclosed that a roller-conveyor could be utilized to feed rows of the fruit simultaneously to the top of the grading ramp at a controlled rate.

Another article, entitled "Mechanical Grading of Oranges Based Upon Dynamic Behavior" by W. L. Bryan, B. J. Anderson and G. L. Norman, was published in the same year in the Proceedings of the Florida State Horticultural Society, Vol. 87:313-318, 1974. In this article, the utilization of the inclined ramp having the bottom arc is again disclosed. Additionally, this article discloses the utilization of an inclined ramp in combination with a flat, bounce pad located at the end of the ramp of causing the fruit rolling off of the ramp to bounce into separate catch boxes. This article discloses some of the problems with the utilization of the rolling ramp including the practical difficulty of orienting each piece of fruit for its best rolling axis for rolling down the ramp and because free-fall drop from a conveyor to the ramp tends to cause irregular behavior of some fruit.

SUMMARY OF THE INVENTION

It is an object of this invention to provide a new, improved apparatus for separating clods from desirable agricultural product. The apparatus of this invention includes a conveyor means for transporting an unsorted mixture of desirable agricultural product, such as onions, potatoes or tomatoes, and clods to a point of free fall to allow both the clods and product to freely fall downwardly onto a separation means. The separation means is positioned approximately below the conveyor means in the trajectory of the free-falling unsorted mixture of agricultural product and clods to receive and cause the product and clods to bounce off the separation means at different separation velocities and therefore travel different separation distances into either a product receiving means or a clod receiving means.

In a further aspect of this invention, the separation means includes a rotating, cylindrical, separation roller. The cylindrical separation roller may rotate in the same direction of rotation as the conveyor means in order to cause the clods and agricultural product to bounce off of the roller in generally the same direction as the clods and product travel along the conveyor; or, the separation roller may be rotated in a direction opposite from that of the conveyor in order to cause the clods and agricultural product to rebound in a direction generally opposite to the initial direction of travel of the mixture.

In a further aspect of this invention, a second separation means may be provided to receive at least some of the rebounded agricultural product and clods in order to further separate. And further, a system for separating agricultural product and clods may include at least two separating stages wherein the mixture of clods and product is transported along a first stage conveyor means to a position of free fall and is then separated by rebound off of a separation means to separate out some of the product leaving a once-sorted mixture, which is then passed through a second stage sorting means.

The method of separating clods from agricultural product according to this invention includes the steps of conveying an unsorted mixture of product and clods to a position of free fall, allowing the product and clods to fall freely against a rebounding surface from which the product and clods travel different rebounding distances into a product receiving area and a clod receiving area thereby separating the clods and product from each other. In one aspect of this invention, a multiple stage sorting method is provided for moving an unsorted mixture of product and clods to a point of free fall and causing the product and clods to rebound against a first rebounding surface to cause at least part of the product to travel to a product receiving area and then to move the once-sorted remaining mixture of clods and product to a second position or area of free fall and allow the once-sorted mixture of product and clods to fall freely against a second rebounding surface in order to provide further separation.

These features of this invention will be set forth in greater detail in the specification, which will also disclose additional features of this invention. This Summary of the Invention is intended as a summary only, with the following Description of the Preferred Embodiment disclosing the details of the various aspects of this invention and the claims following the Description setting forth the actual scope of the subject matter of this invention.

BRIEF DESCRIPTION OF THE DRAWINGS

FIG. 5 is an elevational view, partly in schematic form, of the separating apparatus of this invention similar to the apparatus of FIG. 1 wherein the initial conveyor means includes transverse recesses to separate the clods and desirable agricultural product somewhat;

FIG. 6 is an elevational view, partly in schematic, of first and second sorting stages to apply the separation structure of this invention to an initial and remaining mixture of clods and agricultural product in two stages respectively; and FIG. 6A illustrates a third sorting stage which is usable in combination with the first and second sorting stages illustrated in FIG. 6.

DESCRIPTION OF THE PREFERRED EMBODIMENT

Figure 1:
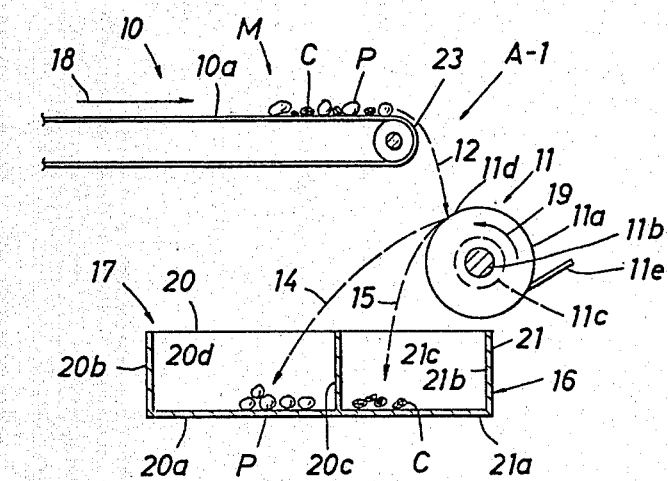
FIG. 1 is an elevational view, partly in schematic, of the apparatus of this invention for separating desirable agricultural product from a mixture of desirable agricultural product and clods and the like wherein the direction of rotation of the separation means is generally opposite from that of the initial conveyor means.

Referring to the drawings and in particular FIG. 1, the sorting apparatus A-1 is provided for separating clods C from a mixture of the clods C and agricultural product P. Basically, the apparatus A-1 includes a conveyor means generally designated by the number 10 which initially transports the mixture M of clods and agricultural product along a conveyor to a position or area of free fall to allow both the clods and agricultural product to fall downwardly to a separation means generally designated by the number 11. The separation means 11 is positioned approximately below the conveyor means in the trajectory 12 of the falling clods C and agricultural product P in order to cause the clods and agricultural product to bounce off of the separation means 11 at varying separation velocities. In this manner, the product P will travel a separation distance defined by the trajectory 14 which is greater than the separation distance travelled by the clod C along the separation trajectory 15. Clod receiving means generally designated by the number 16 is provided for receiving the clods rebounding off of the separation means 11 and product receiving means generally designated by the number 17 are provided for receiving the rebounded desirable agricultural product.

As used herein, the term "clod" refers to ball-like clumps of dirt or stone which may be too large to fall between the spaced rods on the potato chain type of conveyor. Typically, clods such as these are generally about the size of the agricultural product, itself. Typically, such dirt clods are substantially non-rolling and are not only less resilient than the desirable agricultural product, but also have a higher coefficient of friction incurred upon impact so that the clods are likely to be rebounded off of a separating surface at a lower separation velocity than desirable agricultural product. Agricultural product as used herein includes potatoes, onions and other comestibles which are typically grown in the ground and removed by machinery which picks up not only the product but also some of the surrounding soil. Although the principal direction of application of this invention is to the removal of such clods from desirable agricultural product, such as the removal of dirt clods from a mixture of dirt clods and potatoes, there may be other applications for this invention in the comestible field. For example, it is possible that there are other agricultural products wherein one class of product is more resilient and has a lower frictional coefficient upon impact than another class of the same agricultural product, thus allowing the apparatus of this invention to be utilized to sort these two classes of product. Thus, it is possible to utilize the apparatus of this invention to separate one class of agricultural product from another, so long as the rebound and frictional characteristics of the two classes of product are sufficiently different to allow for efficient separation utilizing the structure of this invention. For the purposes of this written description and for the purposes of the claims, the description and claims will be directed to the separation of clods and the like from desirable agricultural product. It should be understood that there may be certain applications wherein the separation may take place between different classes of the same agricultural product.

Referring again to FIG. 1, the conveyor means 10 includes a typical conveyor belt 10a driven between conveyor belt shaft assemblies such as 10b by any suitable means known in the art. In FIG. 1, the direction of travel of the mixture M of clods and agricultural product is in the direction of arrow 18, from left to right. The general direction of rotation, therefore, of the conveyor belt 10a is clockwise. For the purposes of definition, the left to right direction of travel of the mixture M will be known herein as the "forward" direction. The conveyor belt 10a illustrated is a smooth, solid belt. It is within the scope of this invention to utilize various surfaces to convey the mixture M along, including the potato chain or roller chain type of conveyor previously mentioned, the potato chain being advantageous in allowing small, loose material to fall through the chain.

The separation means 11 is a cylindrical roller 11a mounted for rotation about shaft 11b. The rotation is provided by any suitable means such as a hydraulic motor, illustrated schematically by the dotted line at 11c as being mounted at one end of the shaft 11b. The roller 11a may be made of any suitable material such as steel. In FIG. 1, the roller 11a is driven in a counterclockwise direction as identified by arrow 19. The separating roller 11a is positioned on shaft 11b slightly below and slightly away from the end of the conveyor belt 10a for providing a curved surface portion 11d in the path or trajectory 12 of the mixture M of clods and agricultural product thereby providing a rebounding surface for causing the clods and agricultural product to rebound off of the roller 11a. The counterclockwise rotation of the roller 11a in the counterclockwise direction 19 and the position 11d of impact on the roller 11a causes the clods and product to rebound generally in a rearward direction opposite to the initial forward direction of travel of the clods and product along the conveyor belt 10a. The rolling friction and resiliency differences between the clods C and product P causes these items to travel at different separation velocities and thus different separation distances. The separation means 11 further includes some type of wiping element 11e for engaging the surface of the separating roller 11a for cleaning dirt or other debris off of the surface as the roller 11a is continuously rotated. It should be further noted that the axis of rotation of the conveyor belt shaft assembly 10b is parallel to the axis of rotation of the separating roller shaft 11b.

A product receiving means 17 is positioned substantially adjacent to the separating roller 11a below and to the side of the separating roller rebounding surface 11d for receiving the more resilient agricultural product P travelling along the representative trajectory 14. The product receiving means 17 is a box 20 which is formed by bottom 20a, sides 20b and 20c and end portions such as 20d. The product receiving box 20 may be a conveyor with the surface 20a, instead of being a box bottom, being a moving surface provided by a conveyor belt or the like.

The clod receiving means 16 is also illustrated as being a box, here given the number 21. The box 21 includes bottom 21a, which may be a part of the product receiving box bottom 20a, side 21b, side 20c (which is also a side for the product receiving box 20) and ends such as 21c. The clod receiving box 21 is positioned between the separating roller 11a and the product receiving box 20, below and to the side of the roller rebounding surface portion 11d, in order to receive the lesser resilient clods rebounding off of the surface 11d along the trajectory 15. The clod receiving box bottom 21a may also be a conveyor thus providing a moving surface for moving the clods C to some disposal point.

In practicing the method of this invention, the mixture M of clods C and agricultural product P is conveyed along the conveyor belt 10a to an area which may be defined generally as 23 where the clods C and product P travel off the end of the conveyor and fall freely downwardly along the approximate trajectory 12 against the curved reflecting surface 11d. Due to differences in resiliency and rolling friction, the clods C do not bounce off of the curved reflecting surface 11d as fast and as far as does the agricultural product P. Thus, the clods C rebound along a path generally identified as 15 into the clod receiving box or receptacle 21. The rebounded product P rebounds a greater distance along the approximate trajectory 14 into the product receiving box 20, thus separating the desirable agricultural product P from the unsorted mixture M initially conveyed along the conveyor belt 10a.

Figure 2:
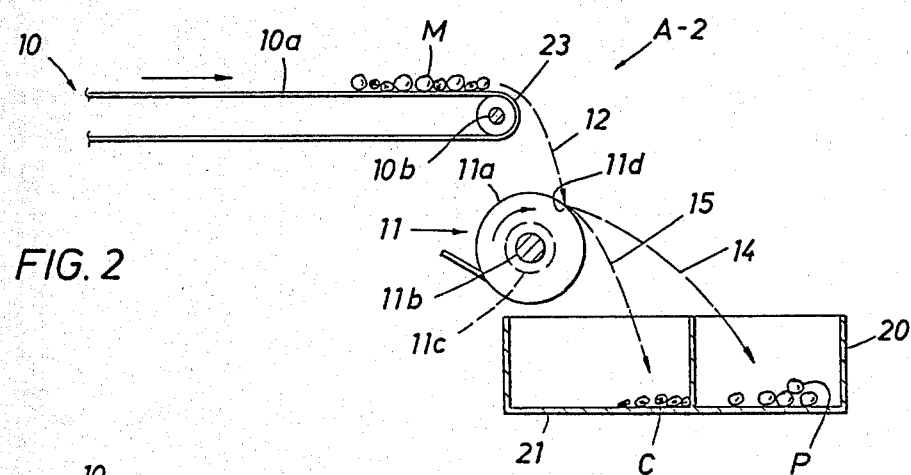
FIG. 2 is an elevational view of the apparatus of FIG. 1 wherein the separation means is rotated in generally the same direction as the initial conveyor means.

Referring to FIG. 2, the apparatus A-2 for separating agricultural product P from clods C is illustrated. Basically, the structure of the apparatus A-2 is identical to that of the apparatus A-1 and thus, the same numbers and letters will be used where applicable. In the apparatus A-2, the mixture M is conveyed along the conveyor belt 10a of the conveyor means 10 to the area 23 of free fall downwardly along the trajectory 12. The separation means 11, although structurally similar, is located in a position different from that of the separation means 11 of FIG. 1. In FIG. 2, the shaft 11b for the separating roller 11a is positioned downwardly, but closer to a position of vertical alignment with the shaft assembly 10b of the conveyor means 10. Thus, the separation means 11 of the apparatus A-2 is positioned slightly differently from that of the separation means 11 of the apparatus A-1.

Furthermore, the rotation means 11c, illustrated by the dotted circle, is provided for rotating the separation roller 11a in a clockwise position in the apparatus A-2, as compared to a counterclockwise position in the apparatus A-1. In this manner, not only are the axes of rotation of the conveyor belt shaft assembly 10b and separating roller shaft 11b the same, but the direction of rotation—substantially clockwise—is also the same. Further, the curved surface 11d, which is the rebounding surface which receives the freely falling clods C and product P, is positioned to the outside of both the conveyor shaft assembly 10b and the separating roller shaft 11b; whereas, in FIG. 1 in the apparatus A-1, the curved rebounding surface 11d is positioned almost in direct alignment with an imaginary line which may be drawn between the conveyor shaft assembly 10b axis of rotation and the axis of rotation 11b of the separating roller 11a. Thus in the apparatus A-2, the freely falling product P and clods C are rebounded outwardly, generally in a forward direction, further away from the conveyor belt 10a rather than back toward the conveyor belt 10a. Again, the trajectory 14 for the more resilient, desirable agricultural product P is greater than the trajectory 15 for the clods C. Therefore, the location of the product receiving box 20 is again further outwardly from the rebounding surface portion 11d of the separating roller 11a than the clod receiving box 21. It has been found that rebound of the clods C and product P in the forward direction, and thus the same general direction as the initial travel of the mixture M along the conveyor belt 10a, provides for a greater capacity of separation of a mixture M than the apparatus A-1 where the product is rebounded rearwardly. However, it has further been found that the rearward rebounding of the separating roller 11a of the apparatus A-1 may provide for more accurate separation than found in the apparatus A-2.

Figure 3:
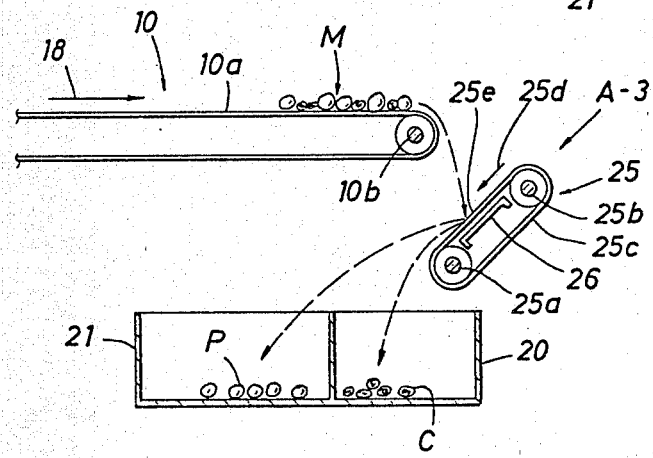
FIG. 3 is an elevational view, partly in schematic, of another embodiment of this invention wherein the separation means is an inclined conveyor.

Referring to FIG. 3, the separating apparatus A-3 is illustrated. In the apparatus A-3, the conveyor means 10, the clod receiving box 21 (clod receiving means 16) and the product receiving box 20 (product receiving means 17), are identical in structure and relative position to the same structure in the apparatus A-1 of FIG. 1, and thus the same numbers and letters apply. In the apparatus A-3, however, a conveyor separation means generally designated by the number 25 is positioned approximately below the initial conveyor means 10 for receiving the clods and product falling off of the conveyor means 10 and rebounding the clods into the clod receiving box 21 and the product receiving box 20. The separation conveyor 25, which is illustrated schematically, includes end rotating shaft assemblies 25a and 25b having mounted thereon conveyor belt 25c. A support surface 26 is positioned underneath the rebounding portion or surface 25e of the conveyor belt 25c for cooperating with the belt 25c to cause the product and clods to rebound. The direction of the general rotation of the conveyor belt 10a is clockwise and the direction of travel along arrow 18 is forward. The separation conveyor means 25 is rotated in a generally counterclockwise direction so that the rebounding surface portion 25e, which actually receives the freely falling clods and product, travels downwardly and generally rearwardly in the direction of arrow 26 in order to enhance the rebounding of the product and clods. The axes of the shaft assemblies 25a and 25b of the separation means 25 is inclined at an acute angle with respect to the forward direction or plane of travel of the mixture M along the conveyor belt 10a so that the rebounding surface conveyor portion 25e not only moves downwardly and generally rearwardly, but also moves at an acute, inclined angle with respect to the direction of forward travel of the mixture M along the conveyor belt 10a. Therefore, even though the axis of rotation of the initial conveyor shaft assembly 10b is parallel to the axes of rotation of the separation conveyor belts shafts 25a and 25b, the plane of rotation caused by the inclined orientation of the shaft assemblies 25a and 25b will be directed at an acute angle with respect to the plane of travel of the mixture M along conveyor belt 10a.

Figure 4:
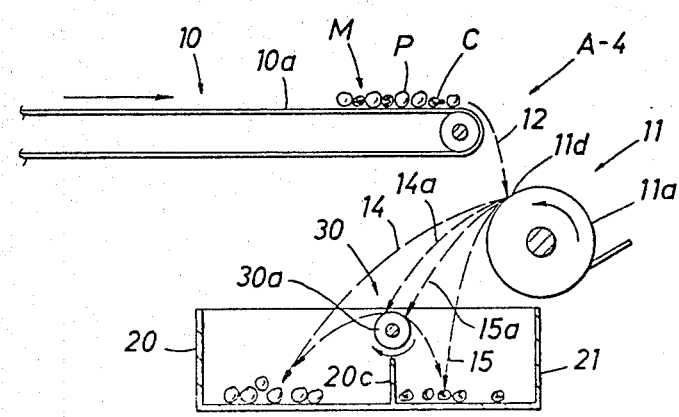
FIG. 4 is an elevational view, partly in schematic, of the embodiments of FIGS. 1–3 wherein a second separation means is utilized in combination with the first separation means.

The separating apparatus A-4 of FIG. 4 is similar to the apparatus A-1 of FIG. 1 except that a second separation means generally designated by the number 30 is used in combination and cooperation with the first separation means already identified as 11. In the apparatus A-4, the conveyor means 10 is identical to the conveyor means 10 of FIG. 1 so that the clods C and product P of the mixture M fall off the end of the conveyor belt 10a along the trajectory 12 against the rebounding surface portion 11d of the separating roller 11a. The separating roller 11a is rotated counterclockwise as compared to the clockwise rotation of the conveyor belt 10a thereby causing the desirable agricultural product P and clods C to rebound in an approximately rearward, downward direction along the representative trajectories 14 and 15, respectively. The product receiving box 20 and the clod receiving box 21 are basically identical to the same numbered structure in FIG. 1 except that the second separation means 30 is mounted directly over the common wall portion 20c (shown to be one-half the height of the common wall portion 20c shown in FIG. 1). The second separation means 30 is provided to rebound product P falling along a trajectory such as 14a and clods C falling along a trajectory such as 15a. The trajectories 14a and 15a represent clods C and product P rebounding off of the first separation roller 11a but falling in an area near the common wall 20c. Not all of the rebounded product or clods will follow the trajectories 14 and 15, respectively, and clearly rebound into the middle of their respective receiving boxes 20 and 21. Rather, it is anticipated that some of the product and clods will fall in the area or zone approximately between the adjacent receptacles, and, without further separation means, may fall into the wrong receiving area.

The separation means 30 includes a generally cylindrical separation roller 30a mounted for clockwise rotation in order to provide a curved rebounding surface for rebounding the product and clods. This separation roller, being located in the area generally between the main portions of the clod receiving box and product receiving box, is provided to rebound product toward the product receiving box and the clods in the opposite direction toward the clod receiving box. Therefore, the direction of rebound for the product is in the same direction as the direction of rebound for the product and clods off the first separation roller whereas the direction of rebound for the clods is opposite thereto.

The apparatus A-5 illustrated in FIG. 5 is substantially identical to the apparatus A-1 with respect to the separation means 11, the product receiving box 20 and clod receiving box 21. In the apparatus A-5, an initial conveyor means 35 is provided by a conveyor belt 36a mounted for generally clockwise rotation about end shaft assemblies such as 36b. The conveyor belt 36a includes a series of transversely oriented recesses 36c for maintaining clods C and product P sufficiently apart to enhance free fall without interference of the product and clods along the trajectory 37 onto the rebounding surface 11d of the separating roller 11a.

Referring to FIG. 6, a sorting system S is illustrated for twice separating the initial unsorted mixture M of product and clods. The sorting system S includes a first stage sorting means 40 and a second stage sorting means 50. The system S may further include a third stage sorting means 60 illustrated in FIG. 6A.

The first stage sorting means 40 includes an initial conveyor means 41 having conveyor belt 41a and a first stage separation means 42 respectively identical to the initial conveyor means 10 and first separation means 11 illustrated in FIG. 2 with respect to the embodiment A-2. The rebounded product is illustrated as having a trajectory 43 off of the rebounding surface 42a of the separation means 42. The rebounded product falls into a first stage product receiving means 44. The first stage product receiving means 44 may be a receptacle or box 45 formed by bottom 45a, sides 45b and 45c and ends such as 45d. The product receiving box 45 may also be a conveyor or the like for conveying the first separated product P to a suitable receptacle or other destination for further processing. An auxiliary separation means 46 is mounted adjacent to side 45c of the product receiving box 45 for providing separation of clods from product which may fall generally near the edge defined by wall 45c of the first stage product receiving means 44. The auxiliary separation means 46 includes a generally cylindrical roller 46a rotated in a counterclockwise direction for allowing at least some of the product falling onto the roller 46a to rebound forwardly into the product receiving box 45 while causing clods (and possibly some of the product landing to the left on the roller axis) to land onto the roller 46a to rebound downwardly.

The arrow 47 defines the approximate path of the once-sorted mixture M-1, which also includes clods and possibly even some product rebounded off of the auxiliary roller 46a, which mixture M-1 lands on the conveyor belt 51 of the second stage conveyor means 52 of the second stage 50. The mixture M-1, which is once-sorted, travels rearwardly in the direction of arrow 53 and free falls along trajectory 54 onto second stage separation roller 55a, which forms the second stage separation means generally designated as 55. The rotation of the conveyor belt 51 for the second stage conveyor means 52 is counterclockwise while the rotation of the second stage separation roller 55a of the second stage separation means 55 is clockwise. Product rebounded along trajectory 57 lands in the second stage product container or box 58. A clod receiving box 59 is shown in dotted lines in a position adjacent to and approximately between the second stage separation roller 55a and the second stage product box 58. The clod receiving box 59 may receive the remaining mixture, which is substantially all clods, which mixture may be defined as M-2; or, in the alternative, the clod receiving box 59 may be removed and the twice-sorted mixture M-2 may be allowed to fall onto a conveyor means 70 of a third stage sorting means generally designated by the number 60. The third stage conveyor means 70 includes a third stage conveyor belt 71 travelling in a forward direction defined by arrow 72. The third stage conveyor belt 71 thus travels in the same direction as the first stage conveyor belt 41a, both of which belts travel in the direction opposite to the rearward direction of travel of the second stage separation belt 51. A third stage separation means generally defined as 73 includes a separation roller 73a which rebounds any remaining product into the product receiving box 74, with any remaining clods falling into a clod receiving box 75. It is within the scope of the sorting system S to provide therefore a plurality of stages such as 40, 50 and 60 to practice a method of serial separation of agricultural product from the mixture M so that at each separation stage, additional product P is removed from the mixture. In the sorting system S, the main separation rollers 42, 55 and 73 are shown rotated clockwise. It is within the scope of this invention to use counterclockwise rotation with one or more of such rollers.

The foregoing disclosure and description of the method and apparatus of this invention are illustrative and explanatory thereof, and various changes in the size, shape and materials as well as in the details of the illustrated construction may be made without departing from the spirit of the invention.

We claim:

1. Apparatus for separating desirable agricultural product from a mixture of such desirable agricultural product and clods and the like, comprising:

first conveyor means for transporting an unsorted mixture of desirable agricultural product and clods to a first area of free fall to allow both said product and clods to freely fall, said fall occurring under the influence of gravity only and having a trajectory with horizontal component due to said first conveyor means;

first separation means positioned approximately below said conveyor means in the trajectory of said free falling unsorted mixture of agricultural product and clods to cause said product and clods to bounce off of said first separation means at different separation velocities and therefore travel different separation distances;

said first separation means includes a first generally cylindrical separation roller for rebounding said product and clods in substantially the same direction of initial travel of said unsorted mixture of product and clods by said conveyor means;

first product receiving means positioned generally adjacent to said first separation means in order to receive said desirable agricultural product;

second conveyor means positioned approximately below said first generally cylindrical roller for transporting a partially sorted mixture of desirable agricultural product and clods received from said first generally cylindrical separation roller to a second area of free fall to allow both said product and clods to freely fall, said fall occurring under the influence of gravity only and having a trajectory with horizontal component due to said second conveyor means;

second separation means positioned approximately below said second conveyor means in the trajectory of said free falling partially sorted mixture of agricultural product and clods to cause said product and clods to bounce off said second separation means at different separation velocities and therefore travel different separation distances;

said second separation means including a second generally cylindrical separation roller rebounding said partially sorted mixture of product and clods in a direction substantially opposite to said direction of travel of said partially sorted mixture of product and clods along said second conveyor means;

second product receiving means positioned generally adjacent to said second separation means in order to receive said desirable agricultural product; and clod receiving means positioned between said second separation means and said second product receiving means to receive said clods.

2. The structure set forth in claim 1, including:

a third generally cylindrical separation roller positioned approximately below said first-mentioned separation means and approximately between said product receiving means and said second conveyor means for additionally separating clods from product rebounding from said first separation means for further separation of clods from product.

3. Apparatus for separating desirable agricultural product from a mixture of such desirable agricultural product and clods and the like, comprising:

conveyor means for transporting an unsorted mixture of desirable agricultural product and clods to an area of free fall to allow both said product and clods to freely fall, said fall occurring under the influence of gravity only and having a trajectory with a horizontal component due to said conveyor means;

separation means positioned approximately below said conveyor means in the trajectory of said free falling unsorted mixture of agricultural product and clods to cause said product and clods to bounce off of said separation means at different separation velocities and therefore travel different separation distances;

product receiving means positioned generally adjacent to said separation means in order to receive said desirable agricultural product;

clod receiving means positioned between said separation means and said product receiving means to receive said clods; and a second separation means positioned approximately below said first-mentioned separation means and approximately between said product receiving means and said clod receiving means for additionally separating clods from product rebounding onto said second separating means from said first separating means for further separation of clods from product.

4. The apparatus set forth in claim 3, including:

said second separation means includes a second generally cylindrical roller positioned approximately between said clod and product receiving means to provide a curved rebounding surface to provide further separation of some of such product and clods; and means for moving said curved rebounding surface of said second cylindrical roller in the opposite direction from initial travel of said unsorted mixture along said first conveyor means.

5. The apparatus set forth in claim 3, including:

said second separation means includes a second generally cylindrical roller positioned approximately between said clod and product receiving means to provide a curved rebounding surface to provide further separation of some of such product and clods; and means for moving said curved rebounding surface of said second cylindrical roller in the same direction as initial travel of said unsorted mixture along said first conveyor means.

* * * * *